Z. E. COFFIN.

Hydrants.

No. 5,745. Reissued Jan. 27, 1874.

Attest:
E. K. Davidson.
Baltis & Long.

Inventor:
Z. E. Coffin
by his Atty
W. D. Baldwin

UNITED STATES PATENT OFFICE.

ZEBULON E. COFFIN, OF BOSTON, MASSACHUSETTS, ASSIGNOR TO THE BOSTON MACHINE COMPANY.

IMPROVEMENT IN HYDRANTS.

Specification forming part of Letters Patent No. 80,143, dated July 21, 1868; reissue No. 5,745, dated January 27, 1874; application filed May 10, 1873.

*To all whom it may concern:*

Be it known that I, ZEBULON E. COFFIN, of Boston, in the county of Suffolk and State of Massachusetts, have invented certain new and useful Improvements in Hydrants; and that the following, taken in connection with the drawings, is a full, clear, and exact description thereof.

Figure 1:
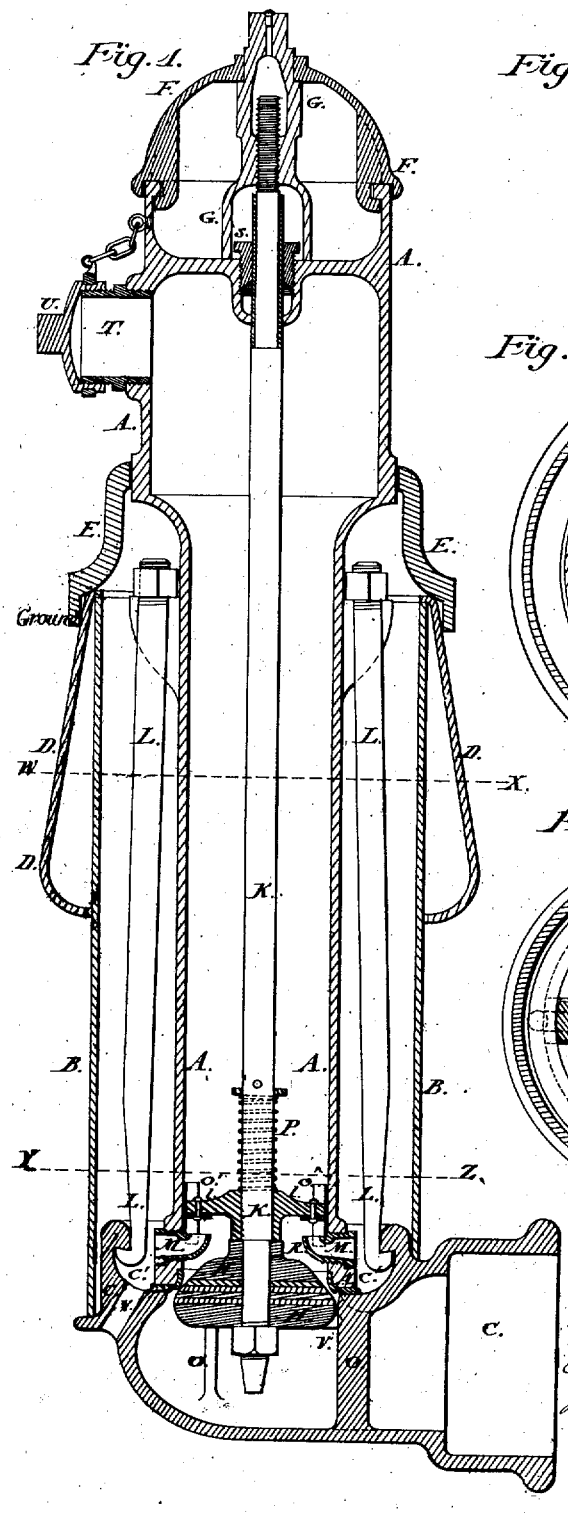
Figure 4:
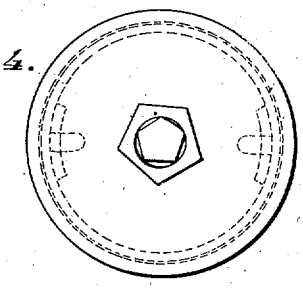
Figure 3:
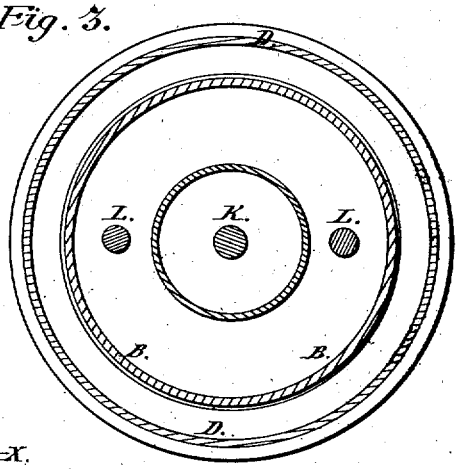
Figure 2:
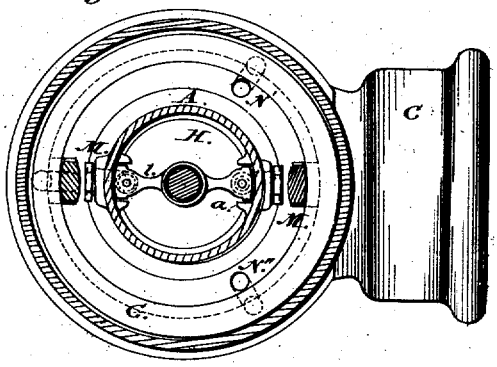

In the drawings, Figure 1 is a vertical central section through my improved hydrant. Fig. 2 is a horizontal section taken on the line Y Z of Fig. 1. Fig. 3 is a similar section on the line W X of Fig. 1, and Fig. 4 is a plan or top view of the cover.

The drawings represent my invention in the form in which I prefer to apply the same, but the hydrant therein shown as a whole is not quite so long in proportion to its diameter as it should be for ordinary use.

My invention relates, first, to improvements in what are usually termed "frost-jackets;" second, to improvements in the mode of securing the hydrant proper, through which the water flows to the main, or elbow leading from the main; and, third, to an improvement in the contrivances for actuating the main valve.

Prior to the date of my invention frost-jackets or cases on hydrants were well known. These frost-jackets surround the hydrant proper, an air-space existing between the two, and, when unattached to the main or elbow, and when not secured to the hydrant proper, serve two purposes—the one to prevent freezing of water in the hydrant proper, the other to prevent the same from being lifted by the frost—the action of the frost being exerted upon the frost-jacket to heave it, while the hydrant proper remains at rest. If the frost-jacket be attached to the main or elbow, it lifts the elbow and causes, or tends to cause, leaks. If it be attached to the hydrant proper, or so connected with it that the jacket cannot lift without lifting the hydrant, then the jacket displaces, or tends to displace, the hydrant and cause leaks, and is useless except as a preventer of the freezing of water in the hydrant proper.

Hydrants have been of late years constructed with waste-valves; and the frost-jacket, when waste-valves are employed, is of little or no use in preventing the freezing of water in the hydrant, as the water above the frost-line runs out through the waste-valves as soon as the main valve of the hydrant is shut.

Hydrants used prior to the date of my invention, in New York and other cities, had frost-jackets not attached to the elbow or main, and rising above the top of the hydrant proper, with an air-space between the jacket and hydrant throughout their lengths, and with an aperture through which the nozzle to which the hose is attached passed. This aperture or slot was longer than the diameter of the nozzle, and the jacket could rise under the influence of frost and be driven into place again without displacing either the hydrant or the main or elbow leading from it.

The form of jacket above referred to involved one other difficulty in its use, which was this, that, when the jacket did heave, earth would fall in below its bottom around the hydrant proper, and this earth in some cases prevented the driving down of the jacket, and was an obstacle in removing and replacing hydrants.

I have endeavored to secure in my hydrant the advantages resulting from the use of all known forms of jacket, and to provide an additional one, premising, before proceeding to the description, that frost seldom extends so low as the top of the elbow or other attachment to the main to which the hydrant is secured, and that a degree of frost which would exert great heaving power near the surface would have no effect at the depth of the bottom of the hydrant.

The hydrant to which these first features of my invention are applied may be of any proper construction, secured in any usual way to the elbow or casting attached to the main.

The frost-jacket is, for reasons hereafter explained, made in two pieces, B and E, both of which are tubular. The lower piece, B, stands on the elbow, and is not attached to it. The upper piece is supported by the lower one, and hugs the hydrant closely above the surface of the ground and below the hose-plug, so far below it that any heaving of the jacket or casing by frost cannot cause it to strike the plug, and thereby lift, or tend to lift, or displace the hydrant, and strain the joints of the hydrant with the elbow, or of the elbow with the main. Although the upper part of the jacket hugs the hydrant, it does not fit it so tightly but that the former can slide on the latter, moving up and down without tending to lift the hydrant; and the jacket is made to fit thus closely in order to prevent cold air from dropping down between the hydrant and the jacket.

In order to hinder heaving of this jacket, except in very heavy and unusual frost, and thereby prevent earth from falling between the lower end of the jacket and the elbow, I have contrived a supplementary frost-jacket, D, which is a short tube or cylinder outside of the jacket, and so supported that it can rise and be driven down without disturbing the lower end of the jacket. In frosts which do not extend below the bottom of this supplementary frost-jacket, it alone will be disturbed, and the jacket proper will remain stationary; and, consequently, dirt will not fall in between its bottom and the top of the elbow, and between the jacket and the hydrant.

The upper part of the frost-jacket is made separate from the lower, in order that it may be lifted to give access to the bolts, hereinafter described, without stirring the lower part of the jacket, thereby permitting one hydrant to be removed, and another to be put in its place, without disturbing the lower part of the jacket and the surrounding earth.

The general idea of making a jacket in two pieces, so as to effect this result, is not new with me. Frost-jackets, which extended over the top of the hydrant, had been made in two pieces or lengths prior to the date of my invention, and were as well known as jackets in one piece.

In heavy frosts, extending down to the elbow, or nearly so, and below the supplementary casing, the frost-jacket proper will be lifted or heaved by the frost, and then my contrivance acts as if the supplementary frost-jacket were removed, or never had been made.

The hydrant proper, with its plug T and valve-rod K, stands on a basin, C′, making part of the elbow. This basin has a rim or inwardly-projecting flange around its top. Below the upper end of the frost-jacket there are lugs with holes in them, cast in one piece with the hydrant. Through these holes pass hook-bolts L L, screwed on their upper ends, and with their hooks catching under the flange. A ring of packing is put on the basin, the hook-bolts are hooked in place, the hydrant is slipped down between the bolts, and the nuts are screwed up. The nuts are easily got at by lifting the upper portion of the frost-jacket without disturbing the lower part thereof, and consequently, when the water is shut off from the main, a defective hydrant can be removed, and one in good condition put in its place, without disturbing the lower part of the jacket or the earth surrounding it.

In former hydrants, where the jacket was made in two lengths, the bolts were short, and bolted to a flange at the bottom of the hydrant, and to the flange of the elbow; and it was necessary to use a long key for the purpose of turning the nuts, which, owing to their position, soon rusted fast, and were unscrewed with difficulty, if at all. Further, owing to the fact that the ledge or flange surrounds the basin, the hook-bolts can be shifted to any part of the periphery, and the hose-plug set at any desired angle with the main.

The main valve is shown at H H; ribs to guide it at O O; ribs to guide the cross-head of the waste-valves at O′ O′. This cross-head I I surrounds the valve-stem, and is held down by a spiral spring, and has attached to its lower side the waste-valves, which close the tops of the waste-passages or pipes M M when the main valve is wide open or partly open. These waste-pipes discharge into the bowl, and thence into the soil through the orifice N. The valve-stem passes through a stuffing-box in the top of the hydrant proper, A, whose gland is shown at S. Upon the top rests a nut, G, which extends through the top of a cap, F, which may be held to the top of the hydrant, so as to prevent the nut from rising, in any proper way, preferably by hooks F′ attached to the cap, and taking under a flange projecting inwardly, and making part of the hydrant's top. This fastening is a sort of bayonet-joint.

The construction of the nut is peculiar: Its bore is enlarged at its lower end, so that it acts as a cover for the stuffing-box; it extends above the cap, so as to be capable of being taken hold of by a wrench or spanner; and it has a hole bored through the top, which may be closed by a small plug. The screw on the valve-stem can be oiled through this hole, which is enlarged as it descends, so as to form an oil-cup, and when the cap is removed, and the nut unscrewed, the stuffing-box can be reached and packed.

I claim as my invention—

1. A frost-jacket, substantially such as is herein described, closely surrounding the hydrant above ground and below the hose-plug, and extending to the elbow or other casting to which the lower part of the hydrant is secured, said jacket being attached neither to the elbow nor the hydrant, and therefore having the capacity of being lifted by frost without disturbing the hydrant or the elbow or the joints, and also preventing cold air from dropping down into the space between the hydrant and the jacket.

2. In combination with a frost-jacket, substantially such as is herein described, a supplementary frost-jacket, substantially such as described, attached neither to the frost-jacket nor the hydrant, but free to move in respect to both, whereby the jacket is protected from the heaving action of moderate degrees of frost, and the results described obtained.

3. In combination with lugs at or near the surface of the ground, and with long bolts holding down a hydrant to the elbow or main, and provided with screw-nuts at their upper ends, a frost-jacket made in at least two pieces in such manner, substantially as specified, that the upper may be lifted, the bolts unscrewed, and the hydrant removed and another reset without displacing the lower part of the frost-jacket, the combination being substantially as described.

4. Hooked bolts, in combination with a flange attached to the casting upon which the hydrant stands, and with the hydrant proper, whereby the hose-plug may be set any desired angle with the main, the combination being substantially such as herein set forth.

5. The nut for actuating the valve-stem, constructed substantially as described, combined with the stuffing-box and valve-stem, substantially as specified.

Z. E. COFFIN.

Witnesses:
JABEZ S. HOLMES,
N. AUSTIN PARKS.